United States Patent
Schusteritz

(10) Patent No.: US 8,392,055 B2
(45) Date of Patent: Mar. 5, 2013

(54) METHOD FOR DETECTING INTERNAL FRICTION IN A STEERING SYSTEM

(75) Inventor: Klaus Schusteritz, Leverkusen (DE)

(73) Assignee: Ford Global Technologies LLC, Dearborn, MI (US)

( * ) Notice: Subject to any disclaimer, the term of this patent is extended or adjusted under 35 U.S.C. 154(b) by 305 days.

(21) Appl. No.: 12/787,738

(22) Filed: May 26, 2010

(65) Prior Publication Data

US 2010/0305803 A1      Dec. 2, 2010

(30) Foreign Application Priority Data

May 27, 2009   (DE) .......................... 10 2009 026 497

(51) Int. Cl.
 *G06F 19/00*        (2011.01)
(52) U.S. Cl. .......................................... 701/31.4; 701/41
(58) Field of Classification Search .................. 701/29.1, 701/29–2, 30.1, 30.5, 30.8, 31.1, 31.3, 31.6, 701/31.7, 41, 43, 31.9; 180/444, 6.44; 280/94.514, 280/94.515; 240/425.5, 438; 73/117.02
See application file for complete search history.

(56) References Cited

U.S. PATENT DOCUMENTS

| | | | |
|---|---|---|---|
| 2004/0256171 A1* | 12/2004 | Sugitani ......................... | 180/402 |
| 2005/0224276 A1* | 10/2005 | Sugitani et al. ............... | 180/402 |
| 2006/0086560 A1* | 4/2006 | Furusho et al. ............... | 180/446 |
| 2007/0289806 A1* | 12/2007 | Matsuda ....................... | 180/444 |
| 2008/0027609 A1* | 1/2008 | Aoki et al. .................... | 701/43 |
| 2008/0073144 A1* | 3/2008 | Takeuchi et al. ............. | 180/446 |
| 2010/0042295 A1* | 2/2010 | Shibata et al. ................. | 701/41 |

FOREIGN PATENT DOCUMENTS

| DE | 10 2006 017 775 A1 | 10/2007 |
|---|---|---|
| DE | 2006017775 | * 10/2007 |

* cited by examiner

*Primary Examiner* — Martha Marc-Coleman
(74) *Attorney, Agent, or Firm* — O'Brien Jones PLLC; Raymond Coppiellie

(57) ABSTRACT

A method for detecting internal friction in an electric steering system of a motor vehicle having a control unit. The method comprises: defining a limiting value for a change in a steering column torque; defining a limiting value for a change in a steering rack position; measuring an actual steering column torque; measuring an actual change in a steering rack position; and generating a fault message if the actual steering column torque exceeds the limiting value for the change in a steering column torque and if an actual change in steering rack position is less than or equal to the limiting value for a change in a steering rack position.

11 Claims, 1 Drawing Sheet

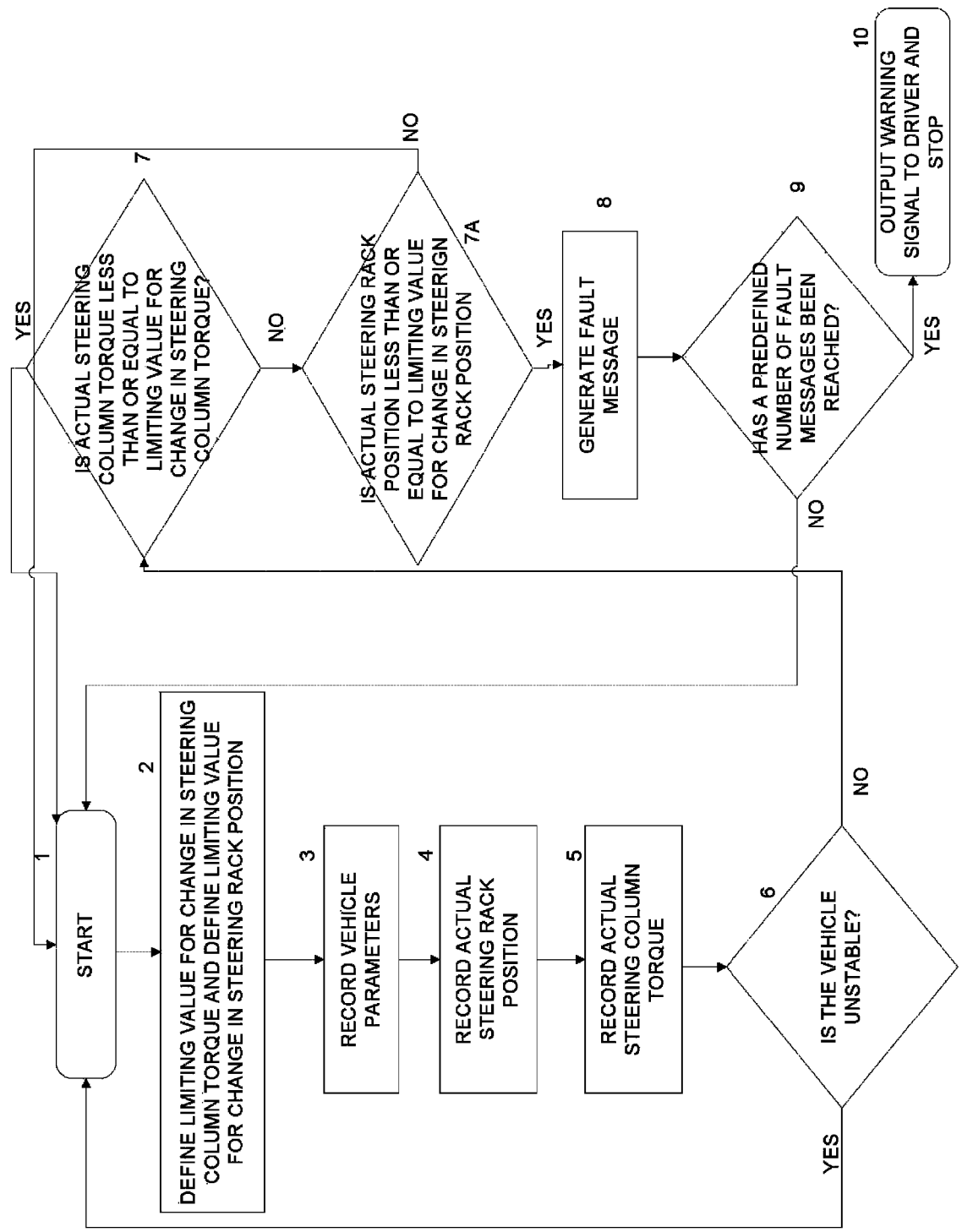

METHOD FOR DETECTING INTERNAL FRICTION IN A STEERING SYSTEM

This patent application claims priority to German Patent Application No. DE 102009026497.3, filed May 27, 2009, the disclosure of which is incorporated herein by reference in its entirety.

INTRODUCTION

The present teachings relate to a method for detecting internal friction in an electric steering system of a motor vehicle that has a control unit.

Electric steering systems can include, for example, electric power assisted steering (EPAS) systems. As the service life of a vehicle progresses, electric steering systems may develop increased friction values, that is to say increased internal friction, in particular in the region(s) of acting elements of the steering system such as the steering rack, pinion gear, and steering column. This internal friction can be brought about, for example, by penetrating water and/or dirt, but also can be due to mechanical damage to one or more of the acting elements of the steering system. An excessively high absolute friction value can place safe functioning of the steering system at risk. A driver of the vehicle should therefore be warned when safe functioning of the steering system may be at risk, so that the driver can initiate vehicle inspection, repair and/or maintenance.

Existing steering systems typically have sensors that are not suitable for directly detecting the abovementioned friction increases. For this reason, considerable computational work has to be carried out in a central control unit (ECU) of the vehicle, such as the steering system ECU, using available sensor data. Extra computing to determine whether increased friction is occurring based on available sensor data can be disadvantageous because the ECU has limited computing and storage capacity for solving the problem of friction detection.

SUMMARY

The present teachings can easily and reliably detect a need to perform inspection, maintenance and/or repair to the steering system of a vehicle without excessive ECU computing needed for directly determining friction increases.

The present teachings provide a method for detecting internal friction in an electric steering system of a motor vehicle having a control unit. The method comprises: defining a limiting value for a change in a steering column torque; defining a limiting value for a change in a steering rack position; measuring an actual steering column torque; measuring an actual change in a steering rack position; and generating a fault message if the actual steering column torque exceeds the limiting value for the change in a steering column torque and if an actual change in steering rack position is less than or equal to the limiting value for a change in a steering rack position.

The present teachings also provide a method for detecting internal friction in an electric steering system of a motor vehicle having a control unit. The method comprises: defining a limiting value for a change in a steering column torque; measuring an actual steering column torque; and generating a fault message if the actual steering column torque exceeds the limiting value for the change in a steering column torque and if there is substantially no actual change in steering rack position.

Certain advantages of the present teachings will be set forth in part in the description which follows, and in part will be obvious from the description, or may be learned by practice of the present teachings. The advantages of the present teachings will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate one several embodiments of the present teachings and, together with the description, serve to explain the principles thereof.

BRIEF DESCRIPTION OF THE DRAWINGS

FIG. 1 is a flowchart of an exemplary embodiment of a method according to the present teachings.

DETAILED DESCRIPTION

Reference will now be made in detail to exemplary embodiments of the present teachings, examples of which are illustrated in the accompanying drawings.

The present teachings specify a method by which a need to inspect, maintain, and/or repair a steering system can be determined easily and reliably, for example when a steering column torque applied to the steering wheel exceeds a defined limiting value of the steering column torque, yet brings about no change in steering rack position. If the actual steering column torque exceeds the defined limiting value, with the steering rack position remaining essentially unchanged, the present teachings infer that an increased internal friction exists among the acting elements of the steering system, and therefore infer a need to send a fault message telling the vehicle operator to inspect, maintain, and/or repair the steering system.

The present teachings contemplate that the limiting value defined for the change in the steering column torque can be set as a function of a vehicle's design. For example, in a vehicle with sport tuning, the limiting value defined for the change in the steering column torque can have a higher absolute value than in the case of a vehicle with comfort tuning. Those skilled in the art will appreciate that the limiting value defined for the change in the steering column torque can defined as a function of additional or alternative vehicle design factors.

In accordance with certain embodiments of the present teachings, various vehicle parameters can be recorded and an actual state of the vehicle can be determined therefrom, permitting a stable state of the vehicle to be determined. Ensuring that the vehicle is in a stable state before the method of the present teachings is performed can ensure that the method is carried out with improved reliability, because a fault message will be generated only if the vehicle is in a stable, straight-ahead travel state without large steering angles or side forces. One example of stable, straight-ahead travel without large steering angles or side forces includes limiting a steering angle to about ±45° at vehicle speeds of about 60 kph. In accordance with certain embodiments, a function or lookup table can be used to set parameters for stable, straight-ahead travel, for example providing a range of stable steering angle ranges for given vehicle speeds.

Ensuring that the vehicle is in a stable state before performing a method in accordance with the present teachings can exclude influences from, for example, the roadway and/or driving maneuvers from negatively effecting the method's evaluation of friction forces within the steering system. The present teachings can thus exclude states of the vehicle in which the vehicle is in a situation entailing increased steering column torques.

Vehicle parameters that may be recorded to determine the vehicle's state can include, for example, an upper vehicle speed and lower vehicle speed. The upper vehicle speed and the lower vehicle speed can define boundaries within which a method in accordance with the present teachings will be performed. The present teachings also contemplate recording vehicle parameters such as vehicle acceleration (lateral acceleration/longitudinal acceleration), vehicle steering rate and/or steering angle, and other measurable vehicle state information as would be appreciated by those skilled in the art.

The present teachings contemplate recording, in addition to the actual steering column torque, an actual steering rack position. A limiting value for a change in the steering rack position can then be defined and compared to the actual steering rack position as explained in more detail below. The limiting value for the change in the steering rack position can be, for example, an absolute value of about 1°, which refers to a rotational angle at the steering wheel. In accordance with certain embodiments of the present teachings, a fault message is generated if the actual steering column torque is greater than the assigned limiting value of the steering column torque, and at the same time the change in the steering rack position is less than or equal to the defined limiting value for the change in the steering rack position (e.g., the exemplary absolute value of about 1°). Such torque application without rotation of the steering rack can signify that, despite activation of the steering wheel (e.g., by the vehicle operator to turn the vehicle), the steering rack has hardly moved or has not moved at all, which can be caused by an increased absolute value of the internal friction within and/or among active elements of the steering system.

In accordance with various embodiments, a method according to the present teachings preferably takes place in a cyclical fashion in a control device (ECU). In an effort to avoid false alarms, the fault message can be fed to an evaluation module that does not create or report a warning message from the fault message until at least a predefined number of fault messages is achieved or exceeded. This means that the evaluation module adds the individual fault messages and does not create or report a warning signal until a specific number of fault messages has been generated and sent to the evaluation module. The present teachings contemplate that the evaluation module can tolerate individual fault messages and reset the fault register to zero or at least count down fault messages after a certain time passes without receiving fault messages.

The warning signal can be acoustic, but can alternatively or additionally be optical or haptic. Embodiments of the present teachings contemplate providing a warning lamp in the vehicle interior, the warning lamp indicating to the driver that there is a need to inspect, maintain, and/or repair the steering system. Haptic feedback can be used alternatively or additionally to alert the driver. The haptic feedback can comprise, for example, vibration generated at suitable locations such as, for example, in the steering wheel, and can be generated by an additional software module within the electric steering system. The warning signals and the evaluation module can be reset after inspection, maintenance, and/or repair has been performed to the steering system.

An actual steering wheel torque input by the vehicle driver, which can be referred to as the steering column torque, is monitored as it is applied to bring about a movement of the steering rack during straight-ahead ("stable") vehicle travel, which monitoring can be used to detect increased internal friction within the steering system. Monitoring can be carried out within an existing steering system internal control unit (ECU) that is already provided in the vehicle. However, another vehicle control unit having access to the corresponding input signals can also be utilized to monitor steering column torque. The limiting steering column torque value to which the actual steering wheel torque input can, as stated above, be adapted to specific platform/vehicle settings in order to be able to carry out the friction detection on different platforms/vehicles.

Steering sensation can change significantly if friction increases within the steering system, for example, due to water and/or dirt penetrating an interior of the steering system. In particular, during straight-ahead travel at average vehicle speeds and with a low steering rate, changes to the steering sensation can be perceived particularly well by a driver because steering can become imprecise. Changes based on increased friction can be determined when two characteristics are observed: (1) the necessary steering column torque to move the steering rack is recorded as an increased value; and (2) the steering rack moves minimally and/or rather abruptly due to stick-slip effects. Stick-slip effects occur when torque is applied to turn the steering rack, increased friction causes the steering rack to stick rather than moving as desired, and then the steering rack suddenly slips when enough torque has been applied to overcome the (increased) static friction.

Existing steering systems typically have at least one torque sensor for recording the steering wheel torque and a subordinate sensor for recording movement of the steering rack (e.g., a motor position sensor within the steering system). To improve detection properties, certain embodiments of the present teachings can include friction detection signals that can be obtained from existing vehicle sensors via a standard vehicle bus such as a CAN bus. The friction detection signals can comprise, for example, the abovementioned signals relating to vehicle speed, vehicle acceleration (lateral acceleration/longitudinal acceleration), steering rate, and/or steering angle. These exemplary signals can be used to determine whether the vehicle is in a stable state, so that steering column torques that are increased during vehicle driving to an "unstable" level are excluded from the detection of increased friction for determining a need to perform inspection, maintenance, and/or repair to the steering system according to the present teachings.

In accordance with various embodiments, friction monitoring can be carried out not only continuously but also periodically. If the steering rack has not moved over a specific time period and at the same time the actual steering column torque within that specific time period is above a specific absolute value (limiting value), the evaluation module can be increased by a fault message. The evaluation module can then also be referred to as an event counter for counting the fault messages. An evaluation module can be used in certain embodiments to avoid a false alarm because the warning signal is not transmitted to the driver until the event counter has counted a predefined number of fault messages, with the evaluation module being preferably increased at each fault message received. The present teachings also contemplate embodiments that reset a counter in the evaluation module or count down a counter in the evaluation module (i.e., employing not only an upward counting direction but also a downward counting direction to eliminate individual incorrect detections or fault messages), for example when a predetermined time passes without additional fault messages being generated.

The present teachings provide a method for determining whether increased internal friction exists within a steering system, the method being easily adaptable, simple to implement, and requiring no addition parts. In certain embodiments, even a change in vehicle configuration (e.g., data becomes unavailable or differing options are utilized for different models or markets) will not trigger false alarms because vehicle configuration information is excluded from the determination of the increased friction.

A method according to the present teachings can be particularly suitable in "belt drive" electronic steering systems. In a belt drive steering system, steering support is generated in an electric motor on the steering gear and is transmitted via a toothed belt to a recirculating ball nut (also referred to as a ball nut assembly (BNA)) that can be secured in the steering gear. The recirculating ball nut moves the steering rack to the left or to the right as demanded. Ingress of water or dirt into the recirculating ball joint can lead to increased friction in the region of the recirculating ball nut. Friction in the region of the drive motor, the recirculating ball nut, the steering rack, and/or the steering rack/pinion can generally be detected by means of the method described herein.

The method can also be used in other types of steering systems such as, for example, dual-pinion steering systems employing transmission of force via a second pinion/steering rack connection. In dual-pinion steering systems, the torque bar and the torque sensor can be arranged spatially above a steering rack position detection means such as a sensor or an encoder, and the torque and steering rack position can therefore be considered separately from one another.

FIG. 1 is a flowchart illustrating an exemplary embodiment of a cycle for detecting internal friction in an electric steering system of a motor vehicle which has a control unit. The control unit can be embodied, for example, as an EPAS control unit.

The method starts in a starting block 1. In block 2, a limiting value for a change in a steering column torque is defined (e.g., a change in steering column torque in relation to stable straight-ahead travel with zero Nm of manual torque). The limiting value can be dependent on certain vehicle settings/design factors. For example, a vehicle with sport tuning can have a higher absolute limiting value than a vehicle with comfort tuning. In block 2, a limiting value for a change in a steering rack position can also be defined. The steering rack limiting value can be, for example, a rotational angle at the steering wheel, for example an absolute value of about 1°. This means that the steering rack limiting value is exceeded if the steering rack moves out of its previous position by more than about 1° due to application of steering column torque. In accordance with various embodiments, the limiting values for the change in steering column torque and change in steering rack position are defined only once. One skilled in the art will understand, however, that the limiting values can be redefined as appropriate during a life of a vehicle. The above-mentioned limiting values are only exemplary and are not meant to be restrictive of the present teachings.

Vehicle parameters are recorded in the block 3. They may be, for example, the vehicle speed, the vehicle acceleration (lateral acceleration/longitudinal acceleration), the steering rate, and/or the steering angle. In block 4, an actual steering rack position is recorded, for example in a motor position sensing unit of the electric steering system. In block 5, an actual steering column torque is recorded, for example in a steering column torque sensor.

In block 6, an actual state of the vehicle is determined from the signals recorded in the blocks 3 to 5, and the system applies predetermined criteria to decide whether the vehicle is in a "stable" state. If the vehicle is in a stable state, the system proceeds to block 7. If the vehicle is in an unstable state, the system returns to the starting block 1. An unstable state of the vehicle is present, for example, if steering maneuvers require an increased steering column torque. A stable state of the vehicle is present in the case of straight-ahead travel of the motor vehicle without large steering angles (e.g., as stated above, a steering angle of ±45° at a speed of 60 kph) or large side forces. Influences of the roadway and/or influences of driving maneuvers can be eliminated in block 6 before determining whether there exists a need to perform steering system inspection, maintenance, and/or repair.

In block 7, the actual steering column torque is compared with the defined limiting value for the change in the steering column torque. In block 7, it is therefore determined whether the actual change in the steering column torque is less than or equal to, or greater than the defined limiting steering column torque value defined in block 2. If the actual steering column torque is greater than the limiting value, the cycle moves to block 7A and determines whether the actual change in the steering rack position is less than, equal to or greater than the assigned limiting steering rack position defined in block 2.

If it is determined in block 7 that the actual change in the steering column torque is less than or equal to the defined limiting value for a change in the steering column torque, the system returns to the starting block 1. This is because, if a torque is applied to the steering column (e.g., a manual torque applied by the driver) is too low while the steering rack is in a stationary state, it is not possible to draw any conclusions regarding proper operation of the steering system in accordance with the present teachings and the system must wait for a greater torque value during a stable state to determine whether the steering system is operating properly. Therefore, the system jumps back to the starting block 1 of the cycle of FIG. 1.

Thus, in block 7, regardless of whether the actual change in the steering rack position is greater than, less than, or equal to the assigned limiting value of the steering rack position, the system returns to starting block 1 if the actual change in the steering column torque is less than or equal to the defined limiting value for a change in the steering column torque.

As stated above, if it is determined in block 7 that the actual change in the steering column torque is greater than the defined limiting value for the change in the steering column torque, the method moves to block 7A and determines whether the actual change in the steering rack position is less than or equal to the assigned limiting value for the change in the steering rack position. If the actual change in the steering rack position is less than or equal to the assigned limiting value for the change in the steering rack position, the method moves to block 8 which generates a fault message. This is because, when the actual change in the steering column torque is greater than the defined limiting value for a change in the steering column torque and the actual rack position is less than or equal to the defined limiting value for rack position, the steering conditions indicate that the driver is applying an increased steering force to the steering wheel, but the steering rack is not moving or is hardly moving at all, which causes the present teachings to infer that there is increased internal friction in the steering system.

If the steering rack position is greater than the assigned limiting value for the change in steering rack position, increased friction is not detected and the method can return to block 1.

The fault message generated in block 8 can then be fed to block 9, which comprises the evaluation module and which does not pass on a warning signal to the driver until, for example, a predefined number of fault messages is reached. In block 9, if the predefined number of fault messages has not been reached, the system returns to starting block 1. The evaluation module can thus act as an event counter that adds fault messages generated in and received from block 8 and does not output the warning signal (e.g., in an acoustic, visual, and/or haptic form) to the driver until the predefined number of fault messages is reached. Once a predetermined number of fault messages is reached and a warning signal is output to the driver, the cycle stops in block 10.

It is therefore possible simply and reliably to detect a need to perform inspection, repair, and/or maintenance to a steering system i, and to inform the driver regarding that need. In various embodiments of the present teachings, after inspection, maintenance, and/or repair has occurred, the evaluation module can be reset (not shown) and the cycle of FIG. 1 can be restarted.

In certain embodiments, once the driver has been warned that the steering system may need inspection, maintenance, and/or repair, the present teachings can continue cycling through a method similar to the embodiment of blocks 1 through 9 of FIG. 1 to monitor steering system performance, or the present teachings can cease cycling until the method is reset, for example upon inspection, maintenance, and/or repair of the steering system. The present teachings contemplate embodiments wherein the warning signal can be turned off if the method continues cycling and a predetermined number of subsequent cycles are performed wherein the steering system is determined to be working properly without symptoms of excessive friction increase in the steering system when the vehicle is in a stable state.

Other embodiments of the present teachings will be apparent to those skilled in the art from consideration of the specification and practice of the embodiments disclosed herein. It is intended that the specification and examples be considered as exemplary only, with a true scope and spirit of the teachings being indicated by the following claims.

What is claimed is:

1. A method for detecting internal friction in an electric steering system of a motor vehicle having a control unit, the method comprising:
    defining a limiting value for a change in a steering column torque;
    defining a limiting value for a change in a steering rack position;
    measuring an actual steering column torque;
    measuring an actual change in a steering rack position; and
    generating a fault message if the actual steering column torque exceeds the limiting value for the change in a steering column torque and if the actual change in steering rack position is less than or equal to the limiting value for a change in a steering rack position.

2. The method of claim 1, further comprising recording actual vehicle parameters and generating a fault message only if the actual vehicle parameters indicate that the vehicle is operating in a stable state.

3. The method of claim 2, wherein the actual vehicle parameters comprise a vehicle speed, a vehicle acceleration, a steering rate, and/or a steering angle.

4. The method of claim 1, further comprising sending the fault message to an evaluation module that does not output a warning message until at least a predefined number of fault messages is reached.

5. The method of claim 1, wherein the limiting value for the change in the steering column torque is set as a function of a setting of the vehicle.

6. A method for detecting internal friction in an electric steering system of a motor vehicle having a control unit, the method comprising:
    defining a limiting value for a change in a steering column torque;
    measuring an actual steering column torque; and
    generating a fault message if the actual steering column torque exceeds the limiting value for the change in the steering column torque and if there is substantially no actual change in steering rack position.

7. The method of claim 6, further comprising:
    defining a limiting value for a change in a steering rack position;
    measuring an actual change in a steering rack position; and
    generating a fault message if the actual steering column torque exceeds the limiting value for the change in a steering column torque and if the actual change in steering rack position is less than or equal to the limiting value for the change in the steering rack position.

8. The method of claim 6, further comprising recording actual vehicle parameters and generating a fault message only if the actual vahicule parameters indicate that the vehicle is operating in a stable state.

9. The method of claim 6, further comprising sending the fault message to an evaluation module that does not output a warning message until at least a predefined number of fault messages is reached.

10. The method of claim 6, wherein the limiting value for the change in the steering column torque is set as a function of a setting of the vehicle.

11. The method of claim 8, wherein the actual vehicle parameters comprise a vehicle speed, a vehicle acceleration, a steering rate, and/or a steering angle.

* * * * *